May 11, 1965 MASAMI SAKURAI 3,183,373
HIGH FREQUENCY HIGH SPEED SWITCHING CIRCUITS
Filed Sept. 25, 1962 2 Sheets-Sheet 1

Masami Sakurai
INVENTOR.

BY George B. Oujevolk
Attorney

Masami Sakurai
INVENTOR.

BY George B. Oujevolk
Attorney 3,183,373

HIGH FREQUENCY HIGH SPEED SWITCHING CIRCUITS

Masami Sakurai, 1406 Hasunuma, Ohmiya-shi, Saitama-ken, Japan

Filed Sept. 25, 1962, Ser. No. 226,081
1 Claim. (Cl. 307—88.5)

This invention relates to high frequency high speed switching circuits, and more particularly to improvements in switching circuits utilizing semiconductor elements wherein switching among various circuits is effected by varying bias potentials impressed upon said semiconductor elements.

It is the principal object of this invention to provide an improved driving circuit for said switching circuits which is simple in construction and yet has a high switching speed.

The features of the invention which are believed to be novel are set forth with particularity in the appended claim. The invention itself, however, as to its organization together with further objects and advantages thereof, may best be understood by reference to the following description taken in connection with the accompanying drawings, in which:

Throughout the drawings, the same or corresponding parts are indicated by the same reference characters.

Figure 1:
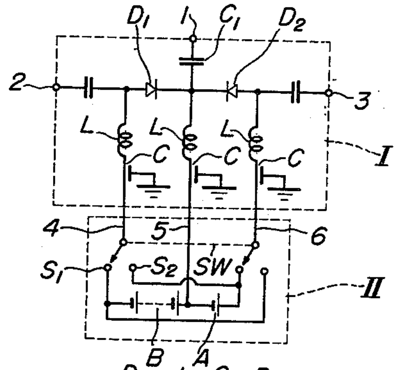
FIG. 1 shows a connection diagram of one of the prior high frequency high speed switching circuits.

Referring to FIG. 1 illustrating a connection diagram of one of the prior high frequency high speed switching circuits, the high speed switch or change over device I comprises a pair of diodes $D_1$ and $D_2$ which are connected in series opposite relation between a pair of branch lines 2 and 3. The main line 1 is connected to the common junction point between these diodes. This common junction point and the opposite terminals of the diodes $D_1$ and $D_2$ are respectively connected to conductors 5, 4 and 6, respectively, through filters each comprising a choke coil L and a by-pass condenser C. The driving circuit II for the change over device includes a source of forward or positive potential A adapted to impress forward bias on the diodes, a source of reverse potential B adapted on impress reverse bias to the diodes and a two pole double throw type switch SW which is arranged as shown in the drawings between said conductors 4 and 6 and said sources A and B. More particularly, these sources A and B are connected in series with their common junction connected with the conductor 5, while conductors 4 and 6 are respectively connected to the movable blades of the switch SW. When this switch is thrown to the left hand contacts $S_1$, as shown in FIG. 1, the diode $D_1$ will be reversely biased from the source of reverse potential B, whereby it will be maintained in the non-conductive condition, whereas the other diode $D_2$ will become conductive by the forward bias impressed thereto from the source of forward potential A, thus establishing a conductive path between the main line 1 and the branch line 3. When the switch SW is thrown to the opposite contacts $S_2$, then the diode $D_2$ will be held non-conductive by the reverse bias supplied from the source B whereas the diodes $D_1$ will become conductive by the forward bias supplied from the source A to establish a conductive path between the main line 1 and the other branch line 2.

Since such prior driving circuit II has utilized a two pole double throw type switch SW for effecting change over of the transmission paths, there were practical limits in the switching speed of said switch SW. In addition, the construction of said switch is relatively complicated.

Accordingly, a more specific object of this invention is to obviate the above mentioned disadvantages by providing an improved driving circuit for the change over device. With such improved driving circuit simple single pole double throw type change over switches or transistors may be substituted for the two pole double throw switch with the result of substantially increasing the change over or switching speed.

Figure 2:
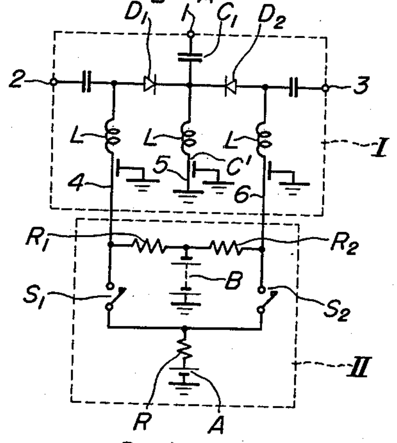
FIG. 2 shows a connection diagram of one embodiment of this invention.

Referring now to FIG. 2, the high frequency high speed change over device or switch I shown therein is the same as that shown in FIG. 1 excepting that the bias conductor 5 connected to the common junction point between diodes $D_1$ and $D_2$ is grounded through the choke coil L. The driving circuit II embodying this invention comprises two single pole single throw switches $S_1$ and $S_2$ which may be interlinked when desired. The stationary contacts of these switches are respectively connected to conductors 4 and 6 and the movable contacts are connected to a source of forward bias A through a resistor R, the negative terminal of this source being grounded. Across conductors 4 and 6 are connected a pair of serially connected resistors $R_1$ and $R_2$ and the common junction point between these resistors is connected to the negative terminal of a source of negative bias B, the positive terminal thereof being grounded. It should be understood that, according to this invention, the absolute value of the potential of the source of forward bias A is made considerably higher than that of the source of reverse bias B.

In operation, when the switch $S_1$ is closed while the switch $S_2$ is opened, the conductor 6 is energized from the source of reverse potential B through the resistor $R_2$ while the conductor 4 is energized from the source of forward potential A so that the diode $D_2$ will become nonconductive or off condition whereas the diode $D_1$ will become conductive or on condition to establish a conductive path between the main line 1 and the branch line 2. At this time the conductor 4 is also supplied with negative bias from the source B through the resistor $R_1$, but as mentioned above, by utilizing a source of positive potential A having larger absolute value than that of the negative potential of the source B and by suitably proportionating relative values of the resistance R, $R_1$ and $R_2$, it is able to provide a suitable positive potential to the conductor 4, thus causing the diode $D_1$ to conduct as above mentioned. When the switch $S_1$ is opened while the switch $S_2$ is closed, then the diode $D_1$ will become non-conductive whereas the diode $D_2$ becomes conductive to establish a conductive path between the main line 1 and the branch line 3.

By proper manipulation of these switches $S_1$ and $S_2$, conductive paths can be switched at high speed and high frequency between the main line 1 and the branch lines 2 and 3.

The driving circuit embodying this invention is advantageous over prior one in that since the source of negative bias B is always connected to both bias conductors 4 and 6, as soon as the movable contact of the previously closed switch $S_1$ or $S_2$ begins to separate, negative bias becomes effective to cause the diode $D_1$ or $D_2$ to become non-conductive. On the other hand, with a double throw switch SW as shown in FIG. 1, the polarity of the bias potential applied to the diodes would not be reversed until the movable contact of the switch engages the opposite contact. Thus the switching or change over between branches 2 and 3 can be effected at higher speed. In addition in accordance with this invention, the switching circuits may be operated with zero direct current potential applied to the junction point between two diodes so that the coupling condenser $C_1$ in the main line 1 and the by-pass condenser C′ associated with the common bias conductor 5 may be eliminated from FIG. 2 which results in the reduction of loss of high frequency power due to the coupling condenser $C_1$ and in the complete elimination of charging current which flows through condensers $C_1$ and $C_2$ when the polarity of bias potential is reversed, thus further increasing the switching speed.

Figure 3:
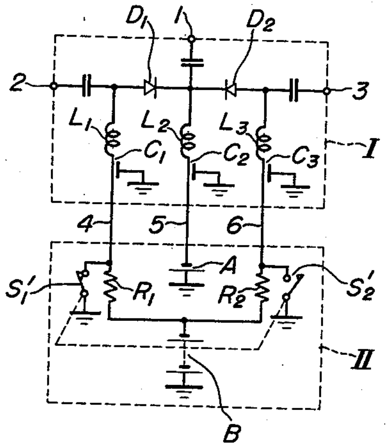
FIGS. 3 and 4 show connection diagrams of further embodiments of this invention.

In the modification shown in FIG. 3, the switching circuit I is similar to those shown in FIGS. 1 and 2. In this case, however, the common bias conductor 5 is connected to the positive pole of a source of positive potential A with its negative pole grounded, and conductors 4 and 6 are respectively connected to the negative pole of a source of negative potential B through resistors $R_1$ and $R_2$, respectively, the positive pole of said source B being grounded. A pair of single pole single throw switches $S_1$ and $S_2$ are connected respectively between conductors 4 and 6 and the ground. In this embodiment the absolute value of the potential of the negative source B is selected to be larger than that of the positive source A.

The operation of this embodiment is similar to that described in connection with FIG. 2. Thus, in the condition shown in FIG. 3 wherein the switch $S_1$ is closed and the switch $S_2$ is opened the diode $D_1$ will be rendered conductive under the forward bias applied thereto from the source A via a circuit including conductors 4 and 5, choke coils $L_1$ and $L_2$ and the switch $S_1$ which is now closed, because the negative source B is short circuited through the switch $S_1$ and the resistor $R_1$. On the other hand inasmuch as the switch $S_2$ is open, the diode $D_2$ is held non-conductive under a reverse bias applied thereto from the negative source B through the resistor $R_2$. When the switch $S_1$ is opened and the switch $S_2$ is closed, the diode $D_1$ is rendered non-conductive under the reverse bias supplied thereto from the negative source B, whereas the diode $D_2$ is rendered conductive by positive bias supplied from the source A to switch the conductive path from the branch circuit 2 to the branch circuit 3.

In this embodiment too, as the source of reverse bias B is permanently connected with both of the bias conductors 4 and 6, switching operation can be effected at higher speed than the prior switching circuits.

Figure 4:
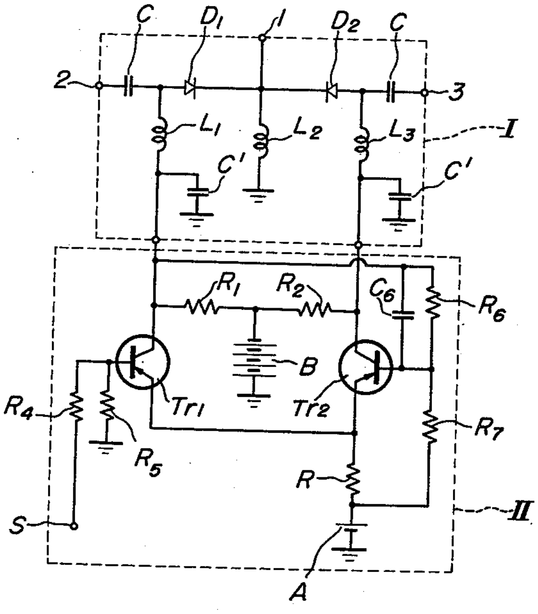

FIG. 4 shows further modification of the driving circuit II of FIG. 2 wherein a pair of transistors $Tr_1$ and $Tr_2$ are substituted for the mechanical switches $S_1$ and $S_2$ for the purpose of further increasing the switching speed. When switching signal is not applied to an input terminal S, the base electrode of the transistor $Tr_1$ will be biassed negatively by the source A through the ground and a resistor $R_5$ whereas the transistor $Tr_2$ will be supplied with a negative potential expressed by $$\frac{R_7}{R_1+R_6+R_7}\cdot E_B$$

where $E_B$ is the voltage of the source B. By selecting the values of resistors $R_6$ and $R_7$ so as to satisfy the equation $$|E_A|>\left|\frac{R_7}{R_1+R_6+R_7}\cdot E_B\right|$$

where $E_A$ is the voltage of the source A, larger collector current will flow through the transistor $Tr_1$ than through the transistor $Tr_2$. At this time the collector voltage of the transistor $Tr_1$ will be reduced due to the voltage drop across the resistor $R_1$ whereby to reduce the voltage impressed upon the base of the transistor $Tr_2$, thus reducing the collector current of the transistor $Tr_1$. When the collector current of the transistor $Tr_1$ is reduced beyond a certain value, the collector current of the transistor $Tr_2$ will be reduced to substantially zero. This condition is illustrated by a simplified equivalent circuit diagram shown in FIG. 5. Neglecting the diode $D_1$ the potential difference between a point $a$ and the ground will be substantially represented by $$E_A-E_B\cdot\frac{Rtr_1+R}{R_1}$$

where $Rtr_1$ being the resistance of the emitter-collector circuit of the transistor $Tr_1$. Generally the value of resistor $R_1$ is selected so as to satisfy the equation $R_1>1000X(Rtr_1+R)$ and since $|E_B|<(10\text{–}50)X|E_A|$, said potential difference between the point $a$ and the ground will be substantially equal to $E_A$, thereby biassing in the forward direction the diode $D_1$ to render it conductive. Upon conduction of the diode $D_1$, the potential of the point $a$ will be reduced to a smaller value, say for example $\alpha E_A$ ($\alpha$ being a proportionality constant), which is smaller than said value by voltage drops across $Rtr_1$ and R. In this condition a voltage expressed by $$\left[\frac{R}{R+Rtr_1}-\frac{R_7}{R_6+R_6}\right](1-\alpha)E_B$$

will be impressed across the base and emitter electrodes of the transistor $Tr_2$, wherein the emitter being taken as the reference. Accordingly by selecting the value of the resistors $R_6$ and $R_7$ so as to satisfy the relation $$\frac{R}{R+Rtr_1}>\frac{R_7}{R_6+R_7}$$

the transistor $Tr_2$ will be maintained non-conductive with a positive potential impressed upon its base electrode, and hence the diode $D_2$ will be maintained non-conductive by a reverse bias applied thereacross from the negative source B.

Figure 5:
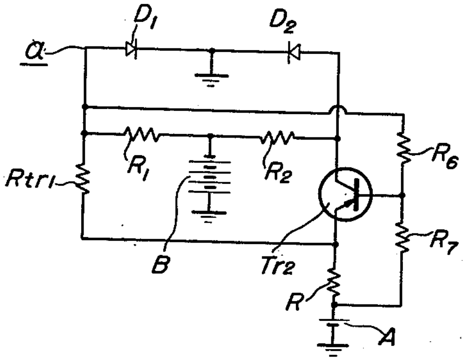
FIG. 5 shows a simplified equivalent circuit of the switching circuit shown in FIG. 4.

Assuming now that a positive signal potential is impressed upon the terminal S of FIG. 5, and that this potential is larger than the voltage $E_A$ of the positive source A, the transistor $Tr_1$ will be rendered non-conductive to raise its collector voltage to that of the negative source B, i.e. $E_B$. Whereupon a negative potential equal to $$\frac{R_7}{R+R_6+R_7}\cdot E_B$$

will be impressed upon the base electrode of the transistor $Tr_2$ to render it conductive. As a result across the resistor R will be created a voltage drop expressed by $$\frac{E_B}{R_2+Rtr_2+R}+\frac{E_A}{R+Rtr_2+R_{D_2}}$$

where $Rtr_2$ represents the collector-emitter resistance of the transistor and $R_{D_2}$ the internal resistance of the diode $D_2$. Therefore, the potential of the base electrode with respect to the emitter electrode of the transistor $Tr_2$ will be shown by the following equation.

$$\left[\frac{E_B}{R_2+Rtr_2+R}+\frac{E_A}{Rtr_1+R+R_{D_2}}\right]R-\frac{E_A+E_B}{R_1+_6+R_6}$$

As long as respective elements are designed to satisfy various conditions above referred to the second term of the preceding equation will be larger than the first term with the result that a negative potential is impressed upon the base electrode of the transistor $Tr_2$ whereby this transistor as well as the diode $D_2$ will continue to conduct so long as the positive control signal is maintained at the input terminal of the transistor $Tr_1$. Upon removal of this control signal, emitter potential of the transistor $Tr_1$ with respect to its base electrode will assume a value expressed by $$-E_A+\left[\frac{E_B}{R_2+Rtr_2+R}+\frac{E_A}{Rtr_1+R+R_{D_2}}\right]R$$

so as to render conductive the transistor $Tr_1$. Thus, the initial condition is restored. Thus it will be clear that with the transistorized driving circuit II shown in this embodiment the diodes $D_1$ and $D_2$ are switched at far higher speed and frequency than in the foregoing embodiments wherein mechanical change over switches are employed, by impressing a weak control signal upon the terminal S.

As will be obvious to those skilled in the art, the mechanical switches $S_1$ and $S_2$ employed in FIG. 3 can be substituted by transistor switches according to the teaching disclosed in connection with the modification shown in FIG. 4.

While certain particular examples of the driving circuit have been disclosed in the switching circuit for purpose of illustration and description, it is to be understood that various changes can be made therein without departing from the spirit and scope of the invention, whereby it is intended to cover in the appended claim all such modifications as fall within the true spirit and scope of the invention.

What is claimed is:

A gate driving device for controlling the operation of any of a plurality of electronic gates; said plurality of electronic gates comprising at least two diodes, a common transmission path, at least two signal lines, each of said diodes being connected between said common path and one of said signal lines and being effective when conductive to connect said common path with the respective one of said signal lines; said driving device comprising at least two transistors, a single transistor being provided for each of said diodes; each of said transistors comprising a base electrode, a collector electrode and an emitter electrode; a source of electrical energy; a separate resistor connecting each of said collector electrodes to one side of said source; means for connecting the other side of said source to ground; means for connecting each of the collector electrodes to the signal line side of the diode associated therewith; means for connecting the common path side of said diodes to ground to establish a complete electrical circuit from said source, through said resistors to said diodes, and through said diodes to ground and said source; means connected to the base electrode of one of said transistors for applying control pulses thereto; first resistor means for connecting the collector electrode of said one transistor to the base electrode of another transistor; means for connecting the emitter electrodes of said transistors together; a biasing means; means for connecting the emitter electrodes of said transistors to said biasing means; and second resistor means for connecting the base electrode of said other transistor to said biasing means so that current normally flows from said source through said other transistor to maintain the diode associated with its collector electrode nonconductive and said one transistor nonconductive until a control pulse is applied to said one transistor to render it conductive and the diode associated with its collector electrode nonconductive.

References Cited by the Examiner

UNITED STATES PATENTS

| | | | |
|---|---|---|---|
| 2,618,753 | 11/52 | Mierlo | 307—88.5 |
| 2,665,845 | 1/54 | Trent | 307—88.5 |
| 2,773,982 | 12/56 | Trousdale | 307—88.5 |
| 2,787,712 | 4/57 | Priebe et al. | 307—88.5 |
| 2,817,772 | 12/57 | Lee | 307—88.5 |

ARTHUR GAUSS, *Primary Examiner.*